US008807107B2

(12) United States Patent
Weinrotter et al.

(10) Patent No.: US 8,807,107 B2
(45) Date of Patent: Aug. 19, 2014

(54) LASER DEVICE FOR THE IGNITION DEVICE OF AN INTERNAL COMBUSTION ENGINE

(75) Inventors: Martin Weinrotter, Stuttgart-Botnang (DE); Pascal Woerner, Stuttgart (DE); Juergen Raimann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 1164 days.

(21) Appl. No.: 12/677,661

(22) PCT Filed: May 26, 2008

(86) PCT No.: PCT/EP2008/056394
§ 371 (c)(1), (2), (4) Date: Jul. 6, 2010

(87) PCT Pub. No.: WO2009/043608
PCT Pub. Date: Apr. 9, 2009

(65) Prior Publication Data
US 2010/0275867 A1 Nov. 4, 2010

(30) Foreign Application Priority Data
Sep. 27, 2007 (DE) ........................ 10 2007 046 312

(51) Int. Cl.

| | |
|---|---|
| ***F02B 19/00*** | (2006.01) |
| ***F02P 23/00*** | (2006.01) |
| ***H01S 3/10*** | (2006.01) |
| ***F02P 23/04*** | (2006.01) |
| ***F02P 15/00*** | (2006.01) |

(52) U.S. Cl.
CPC *F02P 23/04* (2013.01); *F02P 15/00* (2013.01)
USPC ............... 123/143 B; 123/143 R; 123/145 A; 372/25

(58) Field of Classification Search
CPC .................................. F02P 23/04; F02P 15/00
USPC ..... 123/143 C, 143 R, 143 B; 372/23, 25, 70, 372/71
See application file for complete search history.

(56) References Cited

U.S. PATENT DOCUMENTS

| | | | | |
|---|---|---|---|---|
| 4,969,155 | A * | 11/1990 | Kahan | 372/70 |
| 7,340,129 | B2 * | 3/2008 | Yalin et al. | 385/31 |
| 8,312,854 | B2 * | 11/2012 | Weinrotter et al. | 123/143 B |
| 2004/0182929 | A1 | 9/2004 | Aoshima et al. | |
| 2006/0037572 | A1 | 2/2006 | Yalin et al. | |

(Continued)

FOREIGN PATENT DOCUMENTS

| | | |
|---|---|---|
| DE | 3736417 | 5/1988 |
| DE | 10105136 | 8/2002 |

(Continued)

OTHER PUBLICATIONS

International Search Report, PCT International Patent Application No. PCT/EP2008/056394, dated Oct. 23, 2008.

*Primary Examiner* — Hieu T Vo
*Assistant Examiner* — Sherman Manley
(74) *Attorney, Agent, or Firm* — Kenyon & Kenyon LLP

(57) ABSTRACT

A laser device of a so-called laser ignition is provided, in which the heat dissipation is improved between a combustion chamber window and a housing, and the cooling or temperature of the combustion chamber window is able to be adjusted within broad limits by simple modifications.

1 Claim, 5 Drawing Sheets

(56) References Cited

U.S. PATENT DOCUMENTS

| | | | | |
|---|---|---|---|---|
| 2006/0132930 | A1* | 6/2006 | Kopecek et al. | 359/718 |
| 2007/0064746 | A1* | 3/2007 | Winklhofer et al. | 372/10 |
| 2008/0035088 | A1* | 2/2008 | Klausner et al. | 123/143 B |
| 2009/0159032 | A1* | 6/2009 | Gruber | 123/143 B |
| 2010/0000485 | A1* | 1/2010 | Vogel et al. | 123/143 B |
| 2010/0000486 | A1* | 1/2010 | Herden et al. | 123/143 B |
| 2010/0263615 | A1* | 10/2010 | Weinrotter et al. | 123/143 B |
| 2010/0275867 | A1* | 11/2010 | Weinrotter et al. | 123/143 B |

FOREIGN PATENT DOCUMENTS

| | | |
|---|---|---|
| EP | 1519038 | 3/2005 |
| EP | 1674721 | 6/2006 |
| JP | 55-88074 | 6/1980 |
| JP | 2006-194174 | 7/2006 |
| JP | 2006-242041 | 9/2006 |
| WO | WO 2005/066488 | 7/2005 |

* cited by examiner (X)

LASER DEVICE FOR THE IGNITION DEVICE OF AN INTERNAL COMBUSTION ENGINE

BACKGROUND INFORMATION

In a so-called laser ignition, a laser beam is focused into the combustion chamber of an internal combustion engine and ignites the fuel-air mixture present in the combustion chamber in this manner. This requires a so-called laser device, in which the laser beam is generated and focused. In order to decouple the interior of the laser device from the combustion chamber in whose interior high pressures and temperatures naturally prevail, what is known as a combustion-chamber window is provided on the laser device. As the name already implies, this combustion-chamber window is transmissive for the laser beam and may also have a focusing effect. To ensure a fault-free operation of the laser ignition, the combustion-chamber window should be penetrable for the laser radiation across the entire service life of the internal combustion engine. However, it may happen that the necessary optical transparency of the combustion-chamber window is lost due to deposits of exhaust gas on the combustion-chamber window.

In order to prevent these deposits, the laser device should be designed in such a way that the operating temperature on the surface of the combustion-chamber window facing the combustion chamber is high enough to burn off or oxidize deposits, especially organic deposits.

However, the surface temperature of the combustion-chamber window must not reach a level at which self-ignitions of the fuel-air mixture at the surface of the combustion-chamber window occur.

SUMMARY

The present invention relates to providing a laser device in which the surface temperatures of the combustion chamber window that arise during operation of the internal combustion engine are able to be adjusted with sufficient precision and in a simple and reproducible manner.

In addition, by slight modifications of individual dimensions or component characteristics, the surface temperature of the combustion chamber window is to be able to be influenced in the laser device according to the present invention.

According to an example embodiment of the present invention, in a laser device for a laser ignition device of an internal combustion engine having a laser-active solid-state body, a combustion chamber window and a housing, an insert is provided in the housing, which insert is made from a material that has higher thermal conductivity than the material of the housing. The insert includes, in particular, copper, brass, aluminum, or steel having high thermal conductivity.

Because of the material selection for the insert and its dimensions, it is easy to control the heat dissipation and therefore also to set the surface temperature at the combustion chamber window coming about during operation of the internal combustion engine with sufficient precision. Sufficient precision in the context of the present invention means that it is ensured under all circumstances that even under the most unfavorable operating conditions the surface temperature will not reach a level at which the fuel-air mixture inside the combustion chamber ignites in an uncontrolled manner at the surface of the combustion chamber window. This upper temperature limit is load-dependent, so that it is impossible to indicate a fixed upper temperature limit.

On the other hand, the insert according to an example embodiment of the present invention should also ensure that, at least in certain operating states, the surface temperature of the combustion chamber window reaches a level at which possibly existing deposits are oxidized and thus degraded. This may ensure the optical transparency of the combustion chamber window across the entire service life of the internal combustion engine.

Since the insert according to the example embodiment of the present invention is able to be produced in an inexpensive manner, the laser device according to the present invention is likewise able to be produced at relatively low cost.

As a consequence, laser devices having different "heat" values are thus able to be produced by varying the material and/or dimensions of the insert and the main dimensions of the housing. Should the need arise, these laser devices having different heat values may be exchanged for one another because they have the same outer dimensions.

In another advantageous development of the present invention, the combustion chamber window is at least locally surrounded by the housing. This makes it possible to ensure excellent heat dissipation from the combustion chamber window into the housing. This excellent heat dissipation has considerable influence on the effectiveness of the insert according to the present invention.

In order to control the transmission of heat by gas radiation onto the combustion chamber window, in an additional advantageous development it may be provided to partially shield the combustion chamber window from the combustion chamber of the internal combustion engine by a cage. Cage and housing may be developed as one piece or as separate components.

In one especially advantageous embodiment of the housing according to the present invention, the housing has double walls, and the insert is disposed between the housing walls. This makes it possible to accommodate the insert in the housing invisibly, so to speak, and simultaneously enclose it within the housing. This prevents undesired reciprocal effects between the housing and the insert resulting from different materials.

An especially uncomplicated and thus advantageous development of the present invention from the aspect of production engineering provides for the insert to be placed in the interior on a housing wall of the housing. This exemplary embodiment also allows the insert to be in direct contact with the combustion chamber window, thereby improving the heat dissipation even further. Via the contact length between housing or insert on the one side, and the combustion chamber window on the other, the heat dissipation is able to be adjusted and influenced in a simple manner while the component dimensions remain unchanged.

In another advantageous development of the present invention, the combustion chamber window and the housing are interconnected axially and/or radially. This may be accomplished by a press fit, by clamping, by cementing or bonding, or other integral joining methods.

DETAILED DESCRIPTION OF EXAMPLE EMBODIMENTS

Figure 1A:
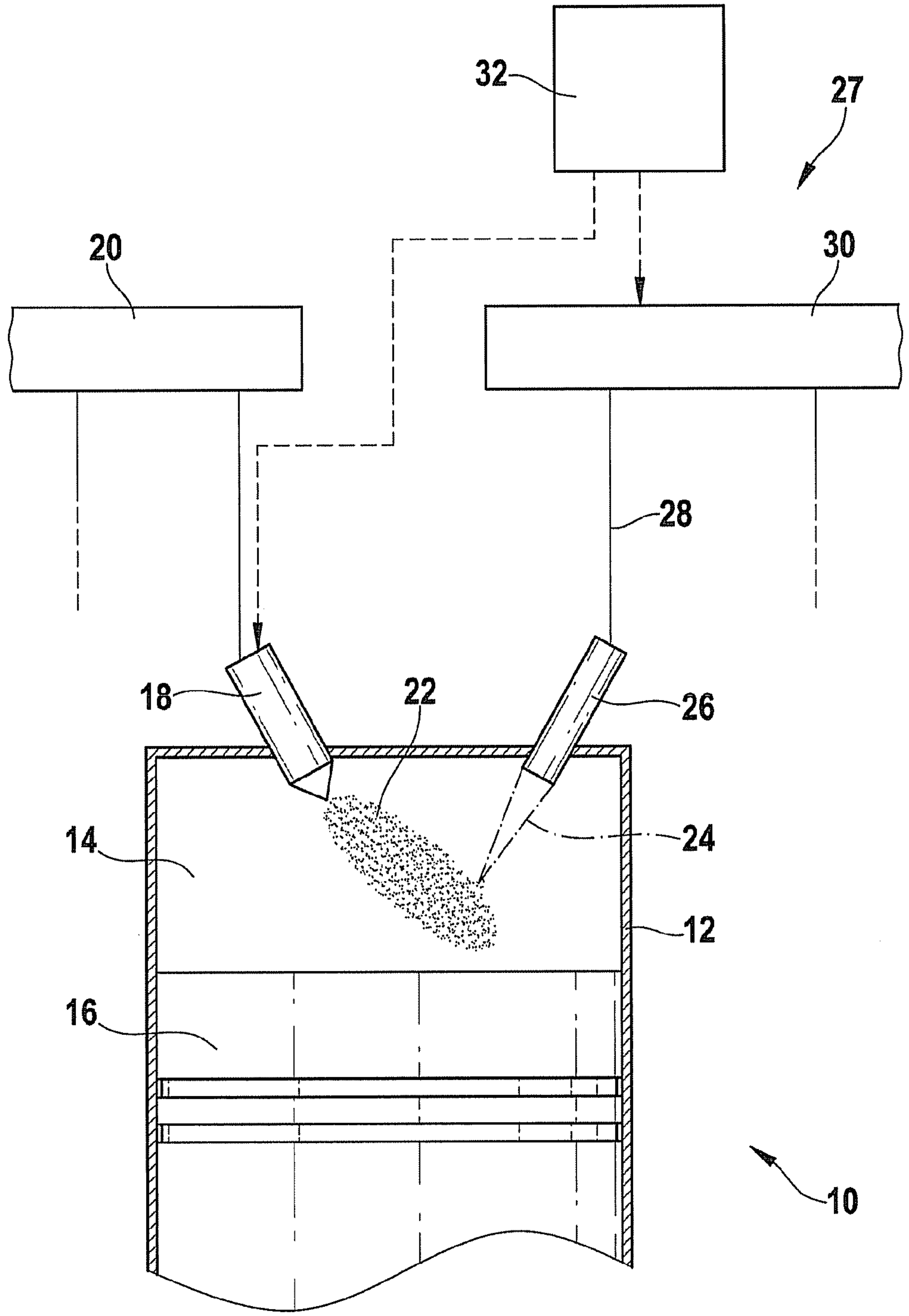
FIG. 1*a* shows a schematic illustration of an internal combustion engine having a laser-based ignition device.

In FIG. 1*a*, an internal combustion engine in its entirety is denoted by reference numeral 10. It may be used for driving a motor vehicle. Internal combustion engine 10 includes one or a plurality of cylinders, of which only one, having a reference numeral 12, is shown in FIG. 1. A combustion chamber 14 of cylinder 12 is bounded by a piston 16. Fuel reaches combustion chamber 14 directly through an injector 18, which is connected to a fuel pressure reservoir 20 which is also referred to as a rail. As an alternative, the mixture formation may also take place outside of combustion chamber 14, e.g., in the intake manifold.

Fuel-air mixture 22 inside combustion chamber 14 is ignited by a laser pulse 24, which is radiated into combustion chamber 14 by an ignition device 27 which includes a laser device 26. For this purpose, an optical fiber device 28 feeds laser device 26 with pumped light from a pumping light source 30. Pumping light source 30 is controlled by a control device 32, which also triggers injector 18.

Figure 1B:
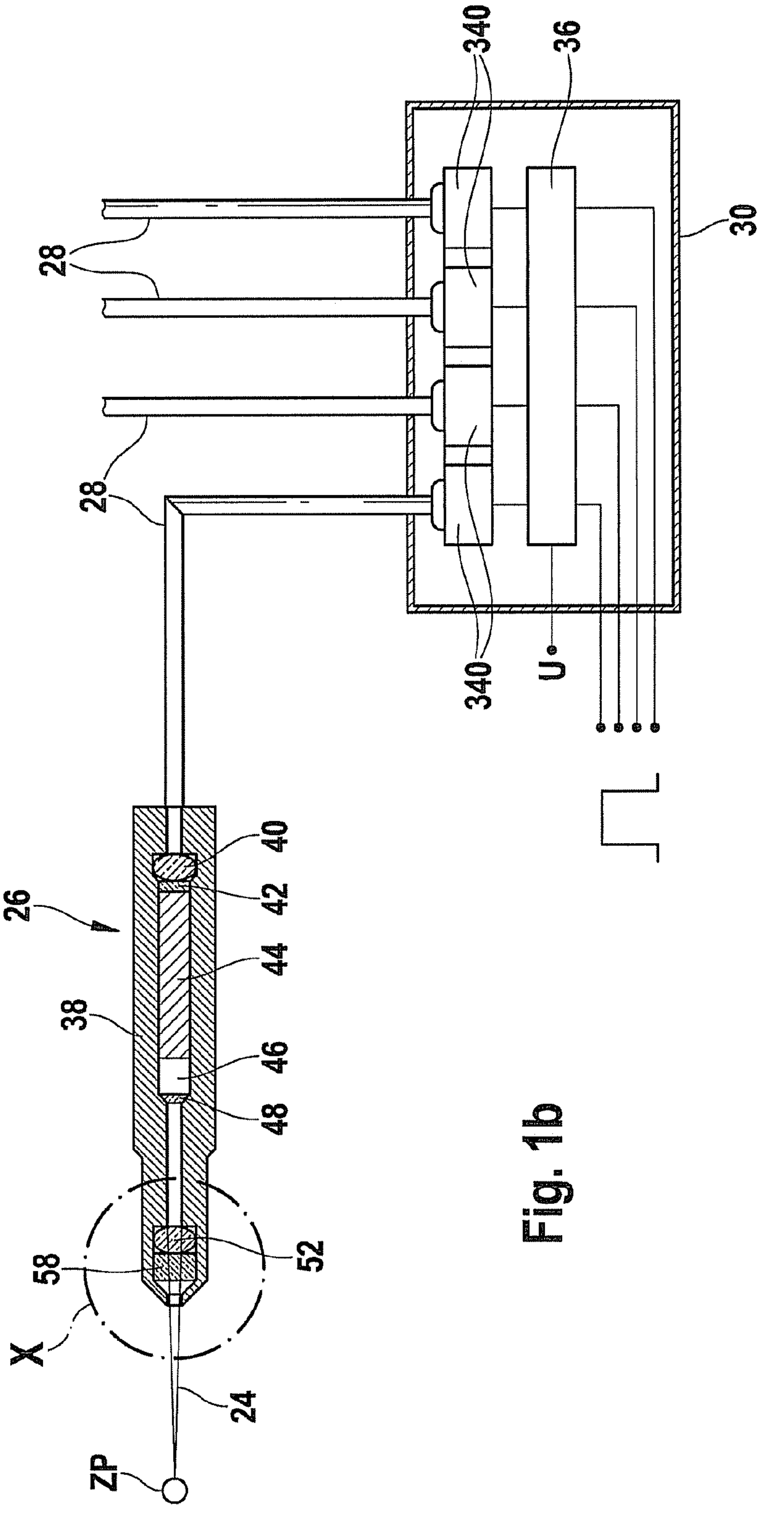
FIG. 1*b* shows a schematic representation of the ignition device in FIG. 1.

As can be gathered from FIG. 1*b*, pumping light source 30 feeds a plurality of optical fiber devices 28 for different laser devices 26, which are allocated to one particular cylinder 12 of internal combustion engine 10 in each case. Toward this end, pumping light source 30 includes a plurality of single laser light sources 340, which are connected to a pulsed current supply 36. Because of the presence of the plurality of individual laser light sources 340, a virtually "stationary" distribution of pumped light to the various laser devices 26 is realized, so that no optical distributors or the like are required between pumping light source 30 and laser devices 26.

For example, laser device 26 has a laser-active solid-state body 44 having a passive Q-switch 46, which in conjunction with a coupling mirror 42 and an output coupler 48 forms an optical resonator. When pumped light generated by pumping light source 30 is applied to laser device 26, it generates a laser pulse 24 in a conventional manner which is focused on an ignition point ZP situated inside combustion chamber 14 via a focusing lens 52 and combustion chamber window 58. The components situated inside housing 38 of laser device 26 are separated from combustion chamber 14 by combustion chamber window 58. Since combustion chamber window 58 must withstand high pressures and temperatures during operation of the internal combustion engine, yet also be transparent for the laser light, there are generally only a few suitable materials, such as quartz glass or sapphire, for example.

Figure 1C:
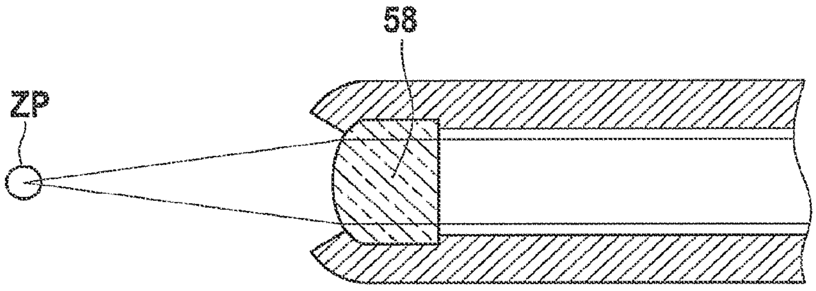
FIG. 1*c* shows an ignition device having a focusing combustion chamber window.

In the exemplary embodiments according to FIGS. 1*b* and 1*c*, combustion chamber window 58 assumes multiple tasks. A first task consists of separating the interior of laser device 26 from the pressures, temperatures and combustion gases prevailing inside combustion chamber 14 of internal combustion engine 10. Therefore, combustion chamber window 58 should be produced from extremely pressure- and temperature-stable material.

In the exemplary embodiment according to FIG. 1*c*, combustion chamber window 58 is additionally designed to focus laser pulse 24 out-coupled from laser-active solid-state body 44 on an ignition point ZP. This makes it possible to dispense with focusing lens 52 (cf. FIG. 1*b*).

For this purpose focusing combustion chamber window 58 according to the present invention, shown in FIG. 1*b*, has a planar surface on the side facing laser-active solid-state body 44. Of course, it would also be possible to place the curved side of combustion chamber window 58 on the side facing solid-state body 44.

The dual function of combustion chamber window 58 results not only in considerable cost savings but also savings in space because of the reduced number of components.

Figure 2:
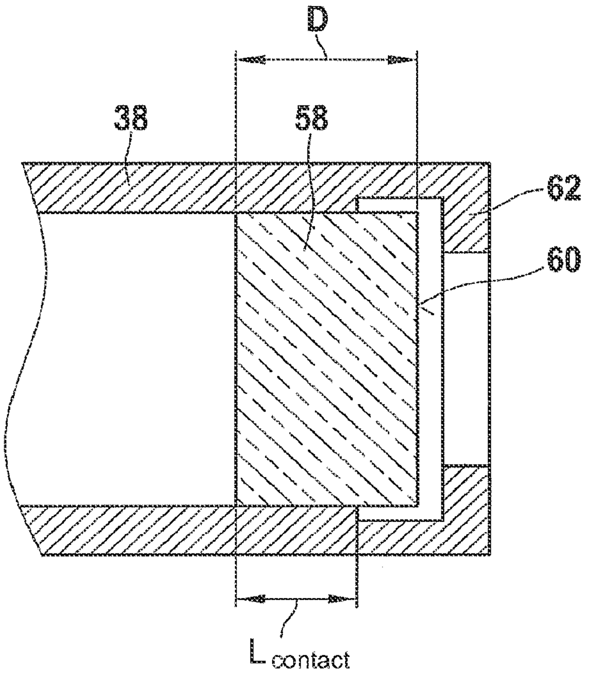
FIGS. 2 through 6 show exemplary embodiments of laser devices according to the present invention.

FIG. 2 shows detail X from FIG. 1*b* considerably enlarged. In contrast to FIG. 1*b*, the combustion chamber (not shown) is situated on the right side of combustion chamber window 58. Solid-state laser 44, passive Q switch 46, and focusing lens 52 (cf. FIG. 1*b*) in FIGS. 2 through 6 are situated on the left side of combustion chamber window 58. They are not shown in FIGS. 2 through 6.

As can be inferred from FIG. 2, housing 38 of laser device 26 encloses combustion chamber window 58 across a contact length $L_{contact}$.

In the exemplary embodiment according to FIG. 2, contact length $L_{contact}$ is shorter than a thickness D of combustion chamber window 58. Because of a transverse press fit in the region of the contact surface between housing 38 and combustion chamber window 58, combustion chamber window 58 is able to be fixed radially inside housing 38. Of course, there is also the possibility of an additional fixation of combustion chamber window 58 by corresponding steps (not shown) in housing 38, or by other means in housing 38. Cementing, soldering or bonding of combustion chamber window 58 and housing 38 are possible as well.

The heat dissipation from combustion chamber window 58 into housing 38 is able to be adjusted in a simple manner and with excellent reproducibility via contact length $L_{contact}$ and thus also the contact surface between combustion chamber window 58 and housing 38.

To ensure that a surface 60 of the combustion chamber window facing combustion chamber 14 (cf. FIG. 1*a*) of internal combustion engine 10 is partially shielded from the gas radiation of the ignited gas-air mixture, a cage 62 is formed on housing 38. This cage 62 has no direct contact with combustion chamber window 58 but surrounds it locally, thereby shielding combustion chamber window 58 in certain sections from the gas radiation. Of course, no shielding should take place in the optically active region of combustion chamber window 58, i.e., in places where the laser beam (cf. FIG. 1*b*) emerges from combustion chamber window 58, since the laser beam would otherwise not reach the interior of combustion chamber 14.

Finally, the cage also has a protective function, in that, in a malfunction of the connection between combustion chamber window 58 and housing 38, it prevents the former from dropping into combustion chamber 14 and causing engine damage.

Figure 3:
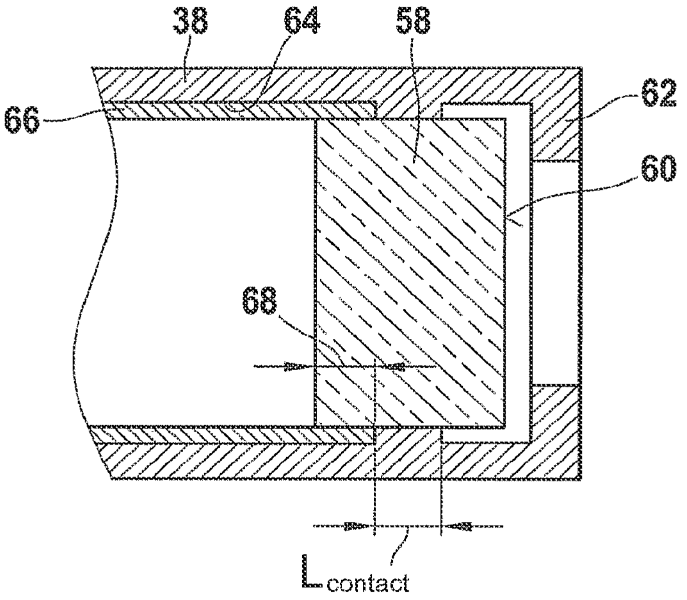

FIG. 3 shows an exemplary embodiment of a laser device according to the present invention, once again in a sectional view and considerably simplified. This exemplary embodiment provides a recess 64 on the inner diameter of housing 38, into which an insert 66 is press-fitted. This insert 66 improves and controls the heat dissipation of heat out of combustion chamber window 58. Therefore, it is preferably made from a material that has excellent thermal conductivity, which is also easy to process.

In the exemplary embodiment according to FIG. 3, insert 66 may be a short tubular section, which is press-fitted into recess 64 of housing 38.

In the exemplary embodiment shown in FIG. 3, insert 66 is in direct contact with combustion chamber window 58 across a length denoted by reference numeral 68. Here, as well, it is possible to improve the heat dissipation in a simple yet very effective manner through the selection and dimensioning of length 68 between insert 66 and combustion chamber window 58 and/or contact length $L_{contact}$ between housing 38 and combustion chamber window 58.

Figure 4:
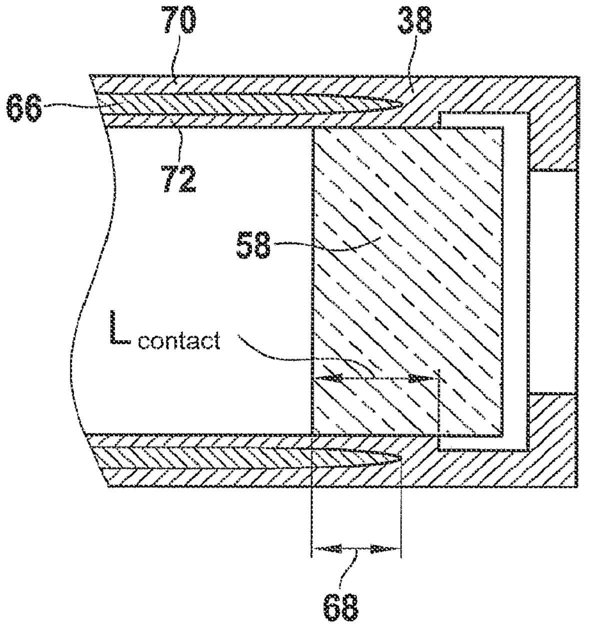

FIG. 4 shows an additional exemplary embodiment of a housing 38 according to the present invention in a simplified manner in a longitudinal section. In this exemplary embodiment, housing 38 is provided with double walls, i.e., an outer wall 70 and an inner wall 72. Insert 66 made from a material having good thermal conductivity is placed between these walls 70 and 72.

It is possible to produce the two walls 70 and 72 of housing 38 from two tubular sections disposed concentrically with respect to one another, and to interconnect them by soldering (not shown) in the region of the contact surface between combustion chamber window 58 and housing 38. As an alternative, it is also possible to plunge-cut a corresponding groove in housing 38 by rotary plunge-cutting and to press-fit insert 66 in the cavity produced in the process.

For the production of large batches a deep-drawing process is especially advantageous, in which a sheet metal made from the insert material, e.g., copper, is disposed between two sheet metals made from the housing material, e.g., steel. This composite of a total of three sheet metals is then jointly deep-drawn.

Finally, there is the option of producing housing 38 from metal powders, e.g., by sintering or metal injection molding processes.

All previously described exemplary embodiments of housing 38 according to the present invention have in common that the combustion chamber window is radially fixed in place inside housing 38.

Figure 5:
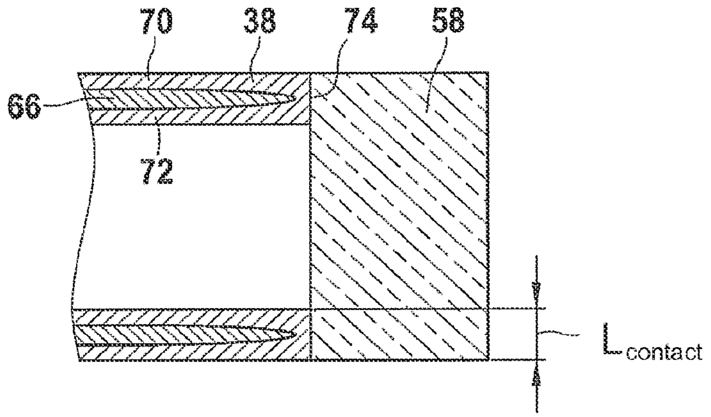

In the exemplary embodiment according to FIG. 5, combustion chamber window 58 is mounted on an end face 74 of sleeve-shaped housing 38. This connection may be implemented by bonding, cementing or some other manner. The connection produces a gas-tight separation of the housing interior from the gases present inside the combustion chamber (cf. FIG. 1*a*) and the pressures and temperatures prevailing there.

It is advantageous in this exemplary embodiment that the diameter of the laser device is reduced. Furthermore, this exemplary embodiment is very economical in the production with respect to material.

Figure 6:
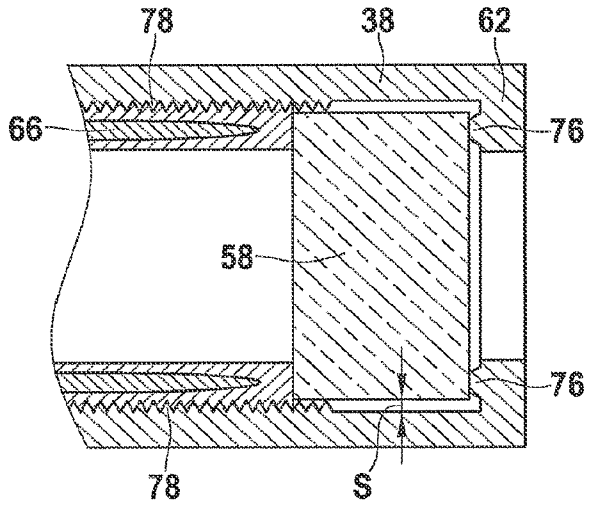

FIG. 6 provides another exemplary embodiment of a laser device according to the present invention. In this laser device, as also in the exemplary embodiment according to FIG. 5, combustion chamber window 58 is fixed in place on housing 38 in the axial direction. However, in the exemplary embodiment according to FIG. 6, the combustion chamber window is locally surrounded by a cage 62. This cage 62 also surrounds housing 38. In order to achieve the required fixation of combustion chamber window 58 relative to housing 38, cage 62 may be developed as tightening nut and be screw-fitted with housing 38. This makes it possible to clamp combustion chamber window 58 between cage 62 and housing 38 in the axial direction. The screw-fitting between cage 62 and housing 38 is shown in FIG. 6 in stylized manner and denoted by reference numeral 78.

As an alternative, it is also possible to join cage 62 and housing 38 by welding, bonding and/or soldering.

For this purpose, webs 76 distributed evenly across the circumference are provided on cage 62, which allow for the required force transmission in the axial direction between cage 62 and combustion chamber window 58.

A gap thickness S has been plotted in FIG. 6 by way of example. This gap thickness is required to prevent any direct contact between cage 62 and the combustion chamber window, since the desired shielding effect of cage 62 is obtained only under those circumstances.

The invention claimed is:

1. A laser device for a laser ignition device of an internal combustion engine, comprising:

a laser-active solid-state body;

a housing containing the laser-active solid-state body;

a combustion chamber window that separates components within the housing from a combustion chamber of the internal combustion engine; and an insert inside the housing made from a material having higher thermal conductivity than the material of the housing, wherein the insert is in direct contact with the combustion chamber window.

* * * * *